United States Patent Office 3,138,541
Patented June 23, 1964

3,138,541
PROCESS FOR PREPARING 6α-SUBSTITUTED-
Δ^{1,4}-3-KETOSTEROIDS
Frederick R. Hanson, Kalamazoo, Mich., assignor to The
Upjohn Company, Kalamazoo, Mich., a corporation of
Delaware
No Drawing. Filed July 23, 1962, Ser. No. 211,873
16 Claims. (Cl. 195—51)

This invention relates to an improved process for the preparation of Δ^{1,4}-3-keto-6α-substituted steroids and, more particularly, for the preparation of the 6α-halo and 6α-alkyl derivatives of prednisone, prednisolone and of the 9α-fluoro, 16 (α and β)-methyl, and 16-hydroxy-16,17-acetonide analogues of prednisone and prednisolone and related compounds.

This application is a continuation-in-part of application Serial No. 82,735, filed January 16, 1961, now abandoned.

The final stages of one of the preferred routes currently employed to prepare Δ^{1,4}-3-keto-6α-substituted steroids involves the following series of reactions (for convenience, only the A and B rings of the steroid molecule are shown):

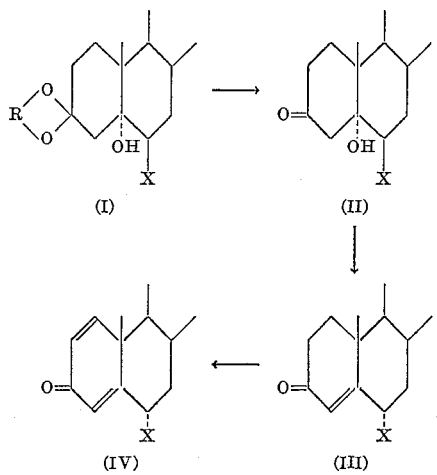

In the above formulae, R represents a lower alkylene radical, preferably an alkylene radical containing from 2 to 6 carbon atoms inclusive, wherein the attaching oxygen to carbon bonds are separated by a chain of at least 2 and not more than 3 carbon atoms, and X represents halogen, preferably chlorine or fluorine, or lower-alkyl, preferably methyl.

In the presently employed processes, each of the above steps (I)→(II)→(III)→(IV) is carried out separately and the reaction product from one step is isolated before being submitted to the next step. Thus, in the current process, the ketal (I) is deketalised, for example, by acid hydrolysis such as by treatment with hydrogen chloride in a solvent such as chloroform at a temperature of the order of 0° C., to produce the corresponding free 3-keto compound (II). The latter compound is then dehydrated, advantageously by treatment with mineral acid using aqueous or anhydrous conditions whereby formation of the Δ^4 double bond and epimerisation of the 6β-substituent occur simultaneously to yield the corresponding Δ^4-3-keto-6α-substituted compound (III). The final step in the known process consists in the 1-dehydrogenation of the compound (III), for example, by exposure of the latter to the action of a 1-dehydrogenating microorganism, preferably a species of the genus Septomyxa, using the conditions described in U.S. Patent 2,897,218.

In a variation of the known process, the compound (II) can also be produced independently of compound (I). Thus, the 3-ketal grouping present in compound (I) may be removed at an earlier stage in the overall process so that compound (II) is produced by a route which does not involve compound (I) as an intermediate.

It has not been suggested previously that each of the steps (I)→(II)→(III)→(IV), or, in the variation mentioned above, the steps (II)→(III)→(IV), could be carried out in one continuous operation without isolation of the various intermediates.

The present invention provides a process for carrying out the above sequence of processes in one continuous operation, without isolation of the intermediates or separation of the accumulated reaction by-products, by carrying out steps (I)→(II)→(III) simultaneously and then adding the entire reaction mixture to the fermentation medium in step (IV). Reaction mixtures normally used in steps (I)→(II)→(III) are ordinarily deleterious to the successful completion of the fermentation step (III)→(IV)

Further, the process of the invention enables the conversion of (I) to (IV) or, in the alternative, (II) to (IV), to be carried out with a very marked increase in overall yield of (IV). In addition to the improved yield of (IV), the process of the invention enables reduction to be effected in the cost of labor and materials, thereby contributing further to the advantages of the improved process.

The present invention, in its broadest aspect, consists in an improved process for the preparation of a 6α-substituted-Δ^{1,4}-3-keto-steroid having in rings A and B the following configuration:

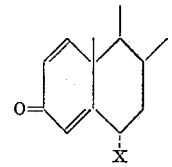

wherein X is selected from the class consisting of lower-alkyl and halogen, which comprises subjecting a compound selected from the class consisting of (a) a 6β-substituted-5α-hydroxy-3-keto steroid having in rings A and B the following configuration:

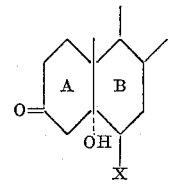

and (b) the corresponding 3-alkylene ketal thereof, to the action of a strong non-oxidising mineral acid in the presence of an inert solvent to obtain a solution of the corresponding 6α-substituted-Δ^4-3-keto steroid having in rings A and B the following configuration:

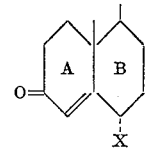

and subjecting the solution so obtained, without any further treatment, to microbiological 1-dehydrogenation to produce the desired 6α-substituted-Δ^{1,4}-3-keto steroid.

The term "strong non-oxidising mineral acid" is inclusive of hydrochloric, hydrobromic, sulfuric, phosphoric acids and the like, the preferred acid being hydrochloric. The term "inert solvent" means any solvent which does not interfere in any way with the process of deketalisation and dehydration and which is also acceptable for use in the microbiological dehydrogenation performed later in the process of the invention. Particularly suitable solvents within this category are the lower aliphatic acid amides and the N-alkyl derivatives thereof which are liquid at ordinary temperatures, for example, formamide, N,N-dimethylformamide, N,N-diethylformamide, N,N-dimethylacetamide, and the like. The preferred solvent for use in the process of the invention is dimethylformamide.

The process of the invention is useful in the production of many known 6α-substituted-Δ$^{1,4}$-3-keto steroids which are therapeutically valuable. For example, the process of the invention can be applied to the preparation of 1-dehydro-6α-methylhydrocortisone (6α-methylprednisolone), a valuable antiinflammatory agent, the final stages of the synthesis of which comprise the conversion of 5α,11β,17α,21-tetrahydroxy-6β-methylpregnane-3,20-dione 21-acylate, or the 3-alkylene ketal thereof, by deketalisation in the case of the ketal, and by dehydration and epimerisation to form the corresponding 6α-methylhydrocortisone 21-acylate, followed by microbiological 1-dehydrogenation to the desired compound.

Similarly the process of the invention can be applied to the preparation of 1-dehydro-6α-fluoro and 6α-chlorohydrocortisone (6α-fluoro- and 6α-chloroprednisolone) which are known valuable anti-inflammatory agents, the final stages of the synthesis of which involve the conversion of 5α,11β,17α,21-tetrahydroxy-6β-fluoro- or chloro-pregnane-3,20-dione 21-acylate, or the 3-alkylene ketal thereof to the desired compounds using reaction steps analogous to those desired above for the production of 6α-methylprednisolone.

By way of further example, the process of the invention can be applied to the improved preparation of 1-dehydro-6α-fluoro-16α- or β-methylhydrocortisone, known anti-inflammatory agents, the final stages of the synthesis of which involve the conversion of 5α,11β,17α,21-tetrahydroxy-6β-fluoro-16α (or β)-methylpregnane-3,20-dione 21-acylate, or the 3-alkylene ketal thereof to the desired compounds using reaction steps analogous to those described above for the production of 6α-methyl-prednisolone.

The process of the invention can be used in the preparation of many other valuable 6α-substituted-Δ$^{1,4}$-3-keto steroids in which the 6-substituent is introduced by ring opening of a 5,6-epoxide to give the corresponding 5α-hydroxy-6β-substituted compound followed by dehydration and epimerisation of the latter and completion of the reaction series with a microbiological 1-dehydrogenation. Additional examples of known valuable compounds in the preparation of which the above sequence of operations is employed, and to the preparation of which the process of the invention can therefore be applied, are 6α,9α-difluoro-16α-(or β)-methylprednisolone and -prednisone, 6α,9α-difluoro-11β,16α,17α,21-tetrahydroxy-1,4-pregnadiene-3,20-dione 16,17-acetonide, and 6α-methyl-9α-fluoro-11β,17α-dihydroxy-1,4-pregnadiene-3,20-dione. Other compounds for the preparation of which the process of the invention can be applied will be obvious to one skilled in the art.

The process of the invention will now be discussed in more detail in relation to a specific embodiment thereof, namely, in its application to the final stages of the production of the valuable anti-inflammatory agent, 1-dehydro-6α-methylhydrocortisone. It will be understood that the details given below are applicable to the use of the process of the invention generally and are not limited only to the preparation of the particular steroid named.

It is known to prepare 1-dehydro-6α-methylhydrocortisone (VIII) according to the following reaction scheme in which a 3-alkylene ketal (V) of a 5α,11β,17α,21-tetrahydroxy-6β-methylpregnane-3,20-dione 21-acylate is deketalised, for example, by acid hydrolysis such as by treatment with hydrogen chloride in a solvent such as chloroform at a temperature of the order of 0° C., to produce the corresponding 5α,11β,17α,21-tetrahydroxy-6β-methylpregnane-3,20-dione 21-acylate (VI). The compound (VI) is then subjected to dehydration. The dehydration is effected preferably in acid solution using aqueous or anhydrous conditions whereby formation of the Δ$^4$ double bond and epimerisation of the 6β-methyl group occur simultaneously to yield the corresponding 6α-methylhydrocortisone 21-acylate (VII). The final step in the known process consists in the 1-dehydrogenation of the compound (VII) (accompanied also by removal of the 21-acyl group) by exposure of the latter to the action of a 1-dehydrogenating microorganism, preferably a species of the genus Septomyxa, using the conditions described in U.S. Patent 2,897,218.

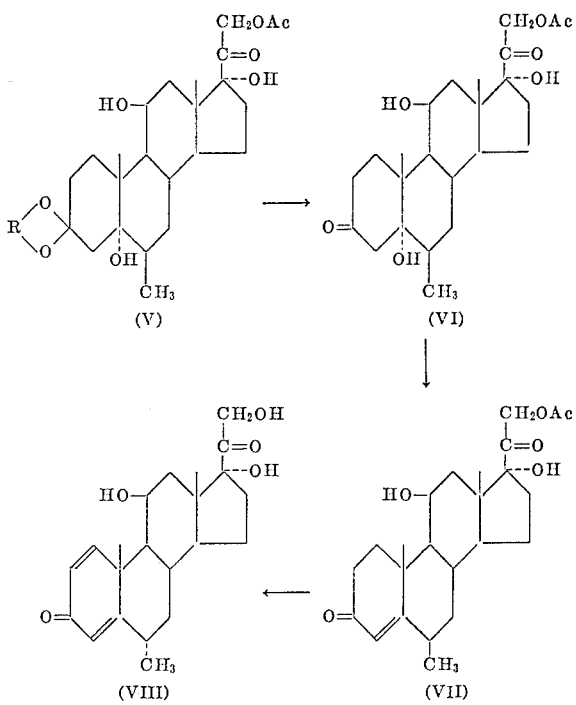

In the above formulae Ac represents the acyl radical of a hydrocarbon carboxylic acid containing from 1 to 12 carbon atoms, inclusive, and preferably represents acetyl, and R is an alkylene radical containing from 2 to 6 carbon atoms, inclusive, wherein the attaching oxygen to carbon bonds are separated by a chain of at least 2 and not more than 3 carbon atoms.

It has not been suggested previously that each of the steps (V)→(VI)→(VII)→(VIII) could be carried out in one continuous operation without isolation of the intermediate products (VI) and (VII).

The present invention provides a process of carrying out the above conversion in one continuous operation, without isolation of the intermediates or separation of the accumulated reaction by-products, by adding the entire reaction mixture from steps (V), (VI) and (VII) to the fermentation medium used in step (VIII). Reaction mixtures normally used in steps (V), (VI) and (VII) are ordinarily deleterious to the successful completion of the fermentation of step (VIII). Further, the process of the invention enables the conversion of (V) to (VIII) to be carried out with a very marked increase in overall yield of (VIII). In addition to the improved yield of (VIII) the process of the invention enables reductions to be effected in the cost of labor and materials thereby contributing further to the advantages of the improved process.

The process of the invention, as applied for purposes of illustration to the preparation of 1-dehydro-6α-methylhydrocortisone, is carried out in the following manner. The simultaneous deketalization of the compound (V) and the dehydration of the resulting compound (VI) is effected by treatment of the ketal (V) with a strong non-oxidizing mineral acid in the presence of an inert solvent as hereinbefore defined. It is advantageous, but not essential, to conduct the reaction in the absence of air, for example, by replacing the air in the reaction vessel with an inert gas such as nitrogen.

The reactants can be admixed in any order, but advantageously the strong non-oxidizing mineral acid is added to the ketal (V) dissolved in the solvent.

The combined deketalization and dehydration is advantageously carried out at a temperature within the range of about 0° C. and about 80° C., and preferably at a temperature within the range of about 25° C. to about 35° C.

The reaction time for the combined deketalization and dehydration is advantageously of the order of about 5 hours to about 100 hours and preferably of the order of about 60 hours to about 70 hours.

The concentration of strong non-oxidizing mineral acid in the solution employed in the combined deketalization and dehydration can vary within wide limits, but advantageously is within the range of about 0.01 N to 3 N, and preferably is within the range of about 0.1 N to about 0.2 N.

The progress of the combined deketalization and dehydration can be followed by withdrawing periodically a sample of the reaction mixture and subjecting the sample to paper chromatographic or other suitable analysis. When the sampling indicates that the conversion of the ketal (V) to the desired 6α-methylhydrocortisone 21-acylate is substantially complete, i.e., 95 to 100 percent conversion has taken place, the reaction mixture is subjected, without any further treatment, to the second and final stage of the process.

Advantageously there is no significant time interval between the completion of the first stage, as described above, and the start of the second stage. However, if it is necessary for any reason to delay the start of the second stage, the reaction mixture from the first stage can be maintained for prolonged periods under refrigeration, i.e., at temperatures within the range of about −5° C. to about 5° C., before being subjected to the second stage of the process and the overall yield obtained in the process of the invention will not be affected significantly.

The second stage of the process, namely, the 1-dehydrogenation by microbiological means accompanied by removal of the 21-acyl group, is performed under conditions such as are described in detail in U.S. Patents 2,602,769 and 2,897,218. The microorganisms which can be employed are those which are well known in the art for effecting 1-dehydrogenation. Especially useful are microorganisms selected from the genera consisting of Calonectria, Alternaria, Colletotrichum, Cylindrocarpon, Ophiobolus, Septomyxa, Didymella, Corynebacterium, Fusarium, Listeria, Bacillus, Erysipelothrix, and Mycobacterium. The preferred microorganisms for use in the process of the present invention are those of the genus Septomyxa, particularly the species *Septomyxa affinis*.

In carrying out the dehydrogenation the microorganism to be used is grown by using an inoculum of the microorganism to inoculate a suitable nutrient medium containing assimilable carbon, nitrogen, sulfur and phosphorus in suitable compound form as well as other compounds (vitamins, for example, thiamine, thiamine-thiazole; plant hormones, for example, auxins) and minerals (for example, zinc, iron, cobalt, copper, potassium, manganese, and the like in metabolically available form) necessary for the life-maintenance and growth of microorganisms.

The fermentation is conducted under aerobic conditions, and, when the growth of the microorganism has reached the appropriate stage, a solution of 6α-methylhydrocortisone 21-acylate, prepared as described above in the first stage of the process of the invention, is added to the fermentation medium. At the same time it is desirable to add to the fermentation liquor a steroidal promoter which serves to increase the yield of the desired 1-dehydro-6α-methylhydrocortisone. Such steroidal promoters are well known in the art and include 3-ketobisnor-4-cholen-22-al, 3-ketobisnor-4-cholenic acid, crude 11β,21 - dihydroxy-1,4,17(20)-pregnatrien-3-one, progesterone, and the like.

After the addition of the 6α-methylhydrocortisone 21-acylate solution, and the steroidal promoter, if used, has been made, the fermentation is maintained under the same conditions of temperature, aeration, stirring etc., employed in the growth of the microorganism until such time as paper chromatographic analysis, or other suitable analysis of samples of the fermentation liquor, indicates that 1-dehydrogenation of the starting steroid is substantially complete. The desired compound (VIII) is then isolated by conventional procedures, for example, by separating the mycelium and subjecting the clarified fermentation liquor to solvent extraction. The compound (VIII) so obtained can then be purified, if desired, using conventional procedures such as recrystallization.

As previously mentioned, the process of the invention enables 1-dehydro-6α-methylhydrocortisone to be obtained from the 3-alkylene ketal of 5α,11β,17α,21-tetrahydroxy-6β - methylpregnane - 3,20 - dione 21-acylate in markedly improved yield when compared with that obtained using the presently known process which involves isolation of the intermediates (VI) and (VII). In general, it is found that the average yield obtained using the process of the invention for the preparation of 1-dehydro-6α-methylhydrocortisone is of the order of 40 percent greater than that obtained using the hitherto known process.

As indicated previously, an alternate method of synthesis curently employed in the preparation of 1-dehydro-6α-methylhydrocortisone and other 6α-substituted-Δ$^{1,4}$-3-keto steroids set forth above has variations in earlier stages which lead to the preparation of the free 3-ketone (VI) without the intermediate production of the 3-ketal (V). That is to say, the alternate synthesis includes a step in the earlier stages thereof which results in hydrolysis of the 3-ketal group whereby the formation of the ketal (V) is by-passed and the 3-ketone (VI) is produced directly.

The process of the invention is also applicable to such alternate syntheses. Thus, the process of the invention can be applied directly to the conversion of (VI) to (VIII) using exactly the same procedure described above for the conversion of (V) to (VIII). The advantages attendant upon the conversion of compound (VI) to (VIII) are the same as those obtained by using the process of the invention to convert compound (V) to (VIII), namely, a significantly increased overall yield accompanied by savings in material and labor costs. Further, both applications of the process of the invention possess the same novel and unexpected feature, namely, the finding that the crude reaction mixture containing the intermediate compound (VII) can be subjected, without any further treatment or purification of any kind, to the action of a 1-dehydrogenating microorganism. Such crude reaction mixtures as that containing the compound (VII) have previously been regarded by those skilled in the art as deleterious to the successful completion of microbiological processes such as that employed to convert compound (VII) to compound (VIII).

The following examples are illustrative of the process of the present invention, but are not to be construed as limiting.

*Example 1*

A solution prepared by dissolving 12 parts of the 3-(2,2-dimethyltrimethylene ketal) of 6β-methyl-5α,11β,17α,21-tetrahydroxypregnane-3,20-dione 21-acetate in 100 parts by volume of dimethylformamide containing 1 part by volume of concentrated hydrochloric acid was placed in a closed vessel and maintained at a temperature of approximately 28° C. for a period of 64 hours. At the end of this time it was determined by paper chromatogram analysis that 96 percent of the starting material had been converted to 6α-methylhydrocortisone. The solution so obtained was then added, without any further treatment, to a fermentation liquor which had been prepared as follows:

A medium containing 440 parts by weight of corn steep liquor (60 percent solids) and 200 parts by weight of cerelose in 19,000 parts by volume of water was adjusted to pH 5.0 and sterilized. The sterilized medium was inoculated with 5 percent vegetative growth of *Septomyxa affinis* (ATCC 6737) and incubated at 28° C. using an agitator rotating at 500 r.p.m. and an air supply of 400 parts by volume per minute. After the fermentation had been in progress for 17 hours, the solution of 6α-methylhydrocortisone 21-acetate, prepared as described above, followed by a solution of 0.5 part by weight of 3-keto-bisnor-4-cholen-22-al in 45 parts by volume of acetone, was added thereto. The incubation was continued for 72 hours after the addition of steroids, using the same conditions of temperature, stirring, and aeration described above. At the end of the incubation, the whole beer was removed from the fermentor and filtered. The clarified beer was then extracted three times with a quarter volume of n-butyl acetate. The combined extracts were concentrated and the solid (8.9 parts by weight) which separated was isolated by filtration and recrystallized from acetone. There was thus obtained 5.97 parts by weight (overall yield from 3-(2,2-dimethyltrimethylene ketal) of 6β - methyl - 5α - 11β,17α,21-tetrahydroxypregnane-3,20-dione 21-acetate=69 percent) of 1-dehydro-6α-methylhydrocortisone having a melting point of 240° C.

Using the above procedure, but replacing hydrochloric acid by sulfuric acid, hydrobromic acid, or phosphoric acid, and/or replacing the 3-(2,2-dimethyltrimethylene ketal) of 6β-methyl-5α,11β,17α,21-tetrahydroxypregnane-3,20-dione 21-acetate by the corresponding 3-ethylene ketal, there is obtained 1-dehydro-6α-methylhydrocortisone in comparable yield and purity.

*Example 2*

A solution prepared by dissolving 26.14 parts by weight of 6β - methyl - 5α,11β,17α,21 - tetrahydroxypregnane-3,20-dione 21-acetate in 193 parts by volume of dimethylformamide containing 2.4 parts by volume of concentrated hydrochloric acid was placed in a closed vessel and maintained at a temperature of approximately 28° C. for a period of 64 hours. At the end of this time, it was determined by paper chromatogram analysis that approximately 95 percent of the starting material had been converted to 6α-methylhydrocortisone. The solution so obtained was then added, without any further treatment, to a fermentation liquor which had been prepared as follows:

A medium containing 1100 parts by weight of corn steep liquor (60 percent solids) and 500 parts by weight of cerelose in 47,500 parts by volume of water, was adjusted to pH 5.0 and sterilized. The sterilized medium was inoculated with 5 percent vegetative growth of *Septomyxa affinis* (ATCC 6737) and incubated at 28° C. using an agitator rotating at 500 r.p.m. and an air supply of 800 parts by volume per minute. After the fermentation had been in progress for approximately 17 hours, the solution of 6α-methylhydrocortisone 21-acetate, prepared as described above, followed by a solution of 1.25 parts by weight of 3-ketobisnor-4-cholen-22-al in 112.5 parts by volume of acetone, was added thereto. The incubation was continued for 72 hours after the addition of steroids, using the same conditions of temperature, stirring, and aeration described above. At the end of the incubation, the whole beer was removed from the fermentor and filtered. The clarified beer was then extracted three times with a greater volume of n-butyl acetate. The combined extracts were concentrated and the solid which separated was isolated by filtration and recrystallized from acetone. There was thus obtained 14.4 parts by weight (overall yield from 6α - methyl-5α,11β,17α,21-tetrahydroxypregnane-3,20-dione 21-acetate=55.1 percent by weight) of 1-dehydro-6α-methylhydrocortisone having a melting point of 240° C.

Using the above procedure, but replacing 6β-methyl-5α,11β,17α,21-tetrahydroxypregnane-3,20-dione 21-acetate by other 21-acylates thereof such as the 21-propionate, 21-butyrate and the like, there is obtained 1-dehydro-6α-methylhydrocortisone in comparable yield and purity.

*Example 3*

A solution prepared by dissolving 14.7 parts by weight of 6β-fluoro-5α,11β,17α,21-tetrahydroxypregnane-3,20-dione 21-acetate 3-(2,2-dimethyltrimethylene ketal) in 80 parts by volume of dimethylformamide was filtered to remove extraneous solid material and the filtrate was transferred to a closed vessel using a total of 24 parts by volume of dimethylformamide for rinsing of the filter and filtrate vessel. Nitrogen was bubbled through the resulting solution for 1 hour at approximately 30° C. before adding thereto with stirirng 0.91 part by volume of a 50 percent by volume solution of concentrated hydrochloric acid in dimethylformamide. The resulting mixture was allowed to stand for 30 hours at the same temperature without stirring. At the end of this time a further 0.91 part by volume of the same acid solution was added with stirring and the resulting mixture was allowed to stand at the same temperature for a further 22 hours. At the end of this time the mixture was stored at approximately 30° C. and added without further treatment to a fermentation liquor which had been prepared as follows:

A medium containing 500 parts by weight of corn steep liquor (60 percent solids) and 250 parts by weight of cerelose in 25,000 parts by volume of water was adjusted to pH 4.9 and sterilized. The sterilized medium was inoculated with 5 percent vegetative growth of *Septomyxa affinis* (ATCC 6737) and incubated at 28° C. using an agitator rotating at 500 r.p.m. and an air supply of 400 parts by volume per minute. After the fermentation had been in progress for 17 hours, the solution of 6α-fluorohydrocortisone 21-acetate, prepared as described above, followed by a solution of 0.5 part by weight of 3-keto-bisnor-4-cholen-22-al in 45 parts by volume of acetone, was added thereto. The incubation was continued for 72 hours after the additon of steroids, using the same conditions of temperature, stirring, and aeration described above. At the end of the incubation, the whole beer was removed from the fermentor and filtered. The clarified beer was then extracted three times with a greater volume of n-butyl acetate. The combined extracts were concentrated and the solid (5.79 parts by weight) which separated was isolated by filtration and recrystallized from acetone. There was thus obtained 4.91 parts by weight [representing a yield of 45.7 percent of theory based on 6β-fluoro-5α,11β,17α,21-tetrahydroxypregnane-3,20-dione 3-(2,2-dimethyltrimethylene ketal)] of 1-dehydro-6α-fluorohydrocortisone.

Using the above procedure, but replacing 6β-fluoro-5α, 11β,17α,21 - tetrahydroxypregnane-3,20-dione 21-acetate 3-dimethylpropylene ketal by 6β-fluoro-5α,11β,17α,21-tetrahydroxypregnane-3,20-dione 21-acetate, there is obtained 1-dehydro-6α-fluoro hydrocortisone in comparable yield and purity.

Similarly, using the above procedure, but replacing hydrochloric acid by sulfuric acid, hydrobromic acid, or phosphoric acid, and/or replacing the 3-(2,2-dimethyl-trimethylene ketal) of 6β-fluoro-5α,11β,17α,21-tetrahydroxypregnane-3,20-dione 21-acetate by the corresponding 3-ethylene ketal, there is obtained 1-dehydro-6α-fluorohydrocortisone in comparable yield and purity.

*Example 4*

Using the procedure described in Example 1, but replacing the 3-(2,2-dimethyltrimethylene ketal) of 6β-methyl - 5α,11β,17α,21 - tetrahydroxypregnane-3,20-dione 21-acetate by 6β-fluoro-16α-methyl-5α,11β,17α,21-tetrahydroxypregnane-3,20-dione 21-acetate or the 3-(2,2-dimethyltrimethylene ketal) thereof, there is obtained 6α-fluoro - 16α-methyl - 11β-17α,21 - trihydroxypregna-1,4-diene-3,20-dione in high overall yield.

Example 5

Using the procedure described in Example 1, but replacing the 3-(2,2-dimethyltrimethylene ketal) of 6β-methyl-5α,11β,17α,21 - tetrahydroxypregnane - 3,20-dione 21 acetate by 6β,9α-difluoro-16α-methyl-5α,11β,17α,21-tetrahydroxypregnane-3,20-dione 21-acetate or the 3-(2,2-dimethyltrimethylene ketal) thereof, there is obtained 6α,9α-difluoro-16α-methyl - 11β,17α,21 - trihydroxypregna-1,4-diene-3,20-dione in high overall yield.

Example 6

Using the procedure described in Example 3, but replacing the 3-(2,2-dimethyltrimethylene ketal) of 6β-fluoro-5α,11β,17α,21 - tetrahydroxypregnane - 3,20-dione by 6β-chloro-5α,11β,17α,21 - tetrahydroxypregnane-3,20-dione 21-acetate or the 3-(2,2-dimethyltrimethylene ketal) thereof, there is obtained 1-dehydro-6α-chlorohydrocortisone in high overall yield.

I claim:

1. In a process for the preparation of a 6α-substituted-Δ¹,⁴-3-ketosteroid having in rings A and B the following configuration:

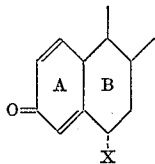

wherein X is selected from the class consisting of loweralkyl and halogen, the improvement which comprises subjecting a compound selected from the class consisting of (a) a 6β-substituted-5α-hydroxy-3-ketosteroid having in rings A and B the following configuration:

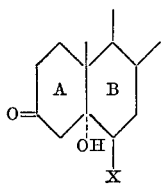

wherein X has the significance above defined, and (b) the corresponding 3-alkylene ketal thereof, to the action of a strong non-oxidizing mineral acid in the presence of an inert solvent to obtain a solution of the corresponding 6α-substituted-Δ⁴-3-ketosteroid and subjecting the solution of said 6α-substituted-Δ⁴-3-ketosteroid so obtained, without any further treatment, to microbiological 1-dehydrogenation to produce the desired 6α-substituted-Δ¹,⁴-3-keto steroid.

2. The process of claim 1 wherein the 1-dehydrogenation is effected by means of a microorganism of the genus Septomyxa.

3. In a process for the preparation of 1-dehydro-6α-X-hydrocortisone, wherein X is selected from the group consisting of methyl and floro, which process includes the steps of deketalizing a 5α,11β,17α,21-tetrahydroxy-6β-X-pregnane-3,20-dione 3-alkyleneketal 21-acylate, dehydrating the 5α,11β,17α,21 - tetrahydroxy - 6β - X - pregnane-3,20-dione 21-aceylate so obtained to produce 6α-X-hydrocortisone 21-acylate, and subjecting the latter compound to microbiological 1-dehydrogenation, the improvement which comprises effecting the deketalization and dehydration in one step by treatment of the said 3-ketal with a strong nonoxidizing mineral acid in the presence of an inert solvent and subjecting the resulting solution of 6α-X-hydrocortisone 21-acylate, without isolation of the latter compound, to microbiological 1-dehydrogenation to produce 1-dehydro-6α-X-hydrocortisone wherein X in each instance has the significance defined above.

4. The process of claim 3 wherein the 1-dehydrogenation is effected by means of a microorganism of the genus Septomyxa.

5. The process which comprises treating a 3-alkyleneketal of 5α,11β,17α,21-tetrahydroxy-6β-methylpregnane-3,20-dione 21-acylate, wherein the alkylene ketal group contains from 2 to 6 carbon atoms, inclusive, the attaching oxygen to carbon bonds being separated by a chain of at least 2 and not more than 3 carbon atoms, and the acylate is that of a hydrocarbon carboxylic acid containing from 1 to 12 carbon atoms, inclusive, with a strong nonoxidizing mineral acid in the presence of an inert solvent at a temperature within the range of about 0° C. and about 80° C. for a time within the range of about 5 hours and about 100 hours, said strong nonoxidizing mineral acid being present in a concentration of about 0.01 N to about 3 N, and subjecting the solution of 6α-methylhydrocortisone 21-acylate so obtained, without any further treatment, to the action of a microorganism of the genus Septomyxa to obtain 1-dehydro-6α-methylhydrocortisone.

6. A process for the preparation of 1-dehydro-6α-methyl-hydrocortisone which comprises treating the 3-(2,2-dimethyldimethyl-trimethylene ketal) of 5α,11β,17α,21-tetrahydroxy-6β-methyl-pregnane-3,20-dione 21 - acylate wherein the acylate is that of a hydrocarbon carboxylic acid containing from 1 to 12 carbon atoms, inclusive, in solution in a mixture of hydrochloric acid and dimethylformamide to obtain a solution of 6α-methyl-hydrocortisone 21-acylate and subjecting the solution so obtained, without further treatment, to the action of a 1-dehydrogenating organism of the genus Septomyxa to obtain 1-dehydro-6α-methyl-prednisolone.

7. The process of claim 6 wherein the 3-(2,2-dimethyltrimethylene ketal) of 5α,11β,17α,21-tetrahydroxy-6β-methyl-pregnane-3,20-dione 21-acylate is the 3-(2,2-dimethyltrimethylene ketal) of 5α,11β,17α,21-tetrahydroxy-6β-methylpregnane-3,20-dione 21-acetate.

8. The process which comprises treating a 3-alkylene ketal of 5α,11β,17α,21-tetrahydroxy-6β-fluoropregnane-3,20-dione 21-acylate, wherein the alkylene ketal group contains from 2 to 6 carbon atoms, inclusive, the attaching oxygen to carbon bonds being separated by a chain of at least 2 and not more than 3 carbon atoms, and the acylate is that of a hydrocarbon carboxylic acid containing from 1 to 12 carbon atoms, inclusive, with a strong nonoxidizing mineral acid in the presence of an inert solvent at a temperature within the range of about 0° C. and about 80° C. for a time within the range of about 5 hours and about 100 hours, said strong nonoxidizing mineral acid being present in a concentration of about 0.01 N to about 3 N, and subjecting the solution of 6α-fluorohydrocortisone 21-acylate so obtained, without any further treatment, to the action of a microorganism of the genus Septomyxa to obtain 1-dehydro-6α-fluorohydrocortisone.

9. A process for the preparation of 1-dehydro-6α-fluoro-hydrocortisone which comprises treating the 3-(2,2-dimethyltrimethylene ketal) of 5α,11β,17α,21-tetrahydroxy-6β-fluoropregnane-3,20-dione 21-acylate wherein the acylate is that of a hydrocarbon carboxylic acid containing from 1 to 12 carbon atoms, inclusive, in solution in a mixture of hydrochloric acid and dimethyl-formamide to obtain a solution of 6α-fluorohydrocortisone 21-acylate and subjecting the solution so obtained, without further treatment, to the action of a 1-dehydrogenating organism of the genus Septomyxa to obtain 1-dehydro-6α-fluoro-hydrocortisone.

10. The process of claim 9 wherein the 3-(2,2-dimethyltrimethylene ketal) of 5α,11β,17α,21-tetrahydroxy-6β-fluoropregnane-3,20-dione 21-acylate is the 3-(2,2-dimethyltrimethylene ketal) of 5α,11β,17α,21-tetrahydroxy-6β-fluoropregnane-3,20-dione 21-acetate.

11. In a process for the preparation of 1-dehydro-6α-X- hydrocortisone wherein X is selected from the group consisting of methyl and fluoro, which process includes the steps of dehydrating and epimerising 5α,11β,17α,21-tetrahydroxy-6β-X-pregnane-3,20-dione 21-acylate to produce 6α-X-hydrocortisone, and subjecting the latter compound to microbiological 1-dehydrogenation, the improvement which comprises effecting the dehydration and epimerization by treatment of said 5α,11β,17α,21-tetrahydroxy-6β-X-pregnane-3,20-dione 21-acylate with a strong nonoxidizing mineral acid in the presence of an inert solvent and subjecting the resulting solution of 6α-X-hydrocortisone 21-acylate, without isolation of the latter compound, to microbiological 1-dehydrogenation to produce 1-dehydro-6α-X-hydrocortisone, wherein X in each instance has the significance defined above.

12. The process of claim 11 wherein the 1-dehydrogenation is effected by means of a microorganism of the genus Septomyxa.

13. The process which comprises treating 5α,11β,17α,21-tetrahydroxy-6β-methylpregnane-3,20-dione 21-acylate wherein the acylate is that of a hydrocarbon carboxylic acid containing from 1 to 12 carbon atoms, inclusive, with a strong nonoxidizing mineral acid in the presence of an inert solvent at a temperature within the range of about 0° C. and about 80° C. for a time within the range of about 5 hours and about 100 hours, said strong nonoxidizing mineral acid being present in a concentration of about 0.01 N to about 3 N, and subjecting the solution of 6α-methyl-hydrocortisone 21-acylate so obtained, without any further treatment, to the action of a microorganism of the genus Septomyxa to obtain 1-dehydro-6α-methylhydrocortisone.

14. A process for the preparation of 1-dehydro-6α-methyl-hydrocortisone which comprises treating 5α,11β,17α,21-tetrahydroxy-6β-methylpregnane-3,20 - dione 21-acylate wherein the acylate is that of a hydrocarbon carboxylic acid containing from 1 to 12 carbon atoms, inclusive, in solution in a mixture of hydrochloric acid and dimethylformamide to produce a solution of 6α-methylhydrocortisone 21-acylate and subjecting the latter solution, without further treatment, to the action of a 1-dehydrogenating organism of the genus Septomyxa to obtain 1-dehydro-6α-methylprednisolone.

15. The process which comprises treating 5α,11β,17α,21-tetrahydroxy-6β-fluoropregnane-3,20-dione 21-acylate wherein the acylate is that of a hydrocarbon carboxylic acid containing from 1 to 12 carbon atoms, inclusive, with a strong nonoxidizing mineral acid in the presence of an inert solvent at a temperature within the range of about 0° C. and about 80° C. for a time within the range of about 5 hours and about 100 hours, said strong nonoxidizing mineral acid being present in a concentration of about 0.01 N to about 3 N, and subjecting the solution of 6α-fluoro-hydrocortisone 21-acylate so obtained, without any further treatment, to the action of a microorganism of the genus Septomyxa to obtain 1-dehydro-6α-fluorohydrocortisone.

16. A process for the preparation of 1-dehydro-6α-fluorohydrocortisone which comprises treating 5α,11β,17α,21-tetrahydroxy-6β-fluoropregnane - 3,20 - dione 21-acylate wherein the acylate is that of a hydrocarbon carboxylic acid containing from 1 to 12 carbon atoms, inclusive, in solution in a mixture of hydrochloric acid and dimethylformamide to produce a solution of 6α-fluorohydrocortisone 21-acylate and subjecting the latter solution, without further treatment, to the action of a 1-dehydrogenating organism of the genus Septomyxa to obtain 1-dehydro-6α-fluoroprednisolone.

References Cited in the file of this patent
UNITED STATES PATENTS
3,045,031     Spero _____ July 17, 1962